(12) United States Patent
Albrecht et al.

(10) Patent No.: US 6,683,977 B1
(45) Date of Patent: Jan. 27, 2004

(54) METHOD OF TAKING THREE-DIMENSIONAL MEASUREMENTS OF OBJECT SURFACES

(75) Inventors: Peter Albrecht, Magdeburg (DE); Roman Calow, Wittenberg (DE); Igor Magziarek, Magdeburg (DE)

(73) Assignee: INB Vision AG., Magdeburg (DE)

( * ) Notice: Subject to any disclaimer, the term of this patent is extended or adjusted under 35 U.S.C. 154(b) by 595 days.

(21) Appl. No.: 09/706,258

(22) Filed: Nov. 3, 2000

(30) Foreign Application Priority Data

Nov. 3, 1999 (DE) .......................... 199 53 063

(51) Int. Cl.[7] ................................ G06K 9/00
(52) U.S. Cl. ........................ 382/154; 356/12
(58) Field of Search ............... 382/154; 345/419, 345/420, 421, 422, 423, 425, 426, 427; 356/12–22, 601, 602, 603, 604, 611, 606

(56) References Cited

U.S. PATENT DOCUMENTS

| | | | | |
|---|---|---|---|---|
| 4,842,411 A | * | 6/1989 | Wood | 356/603 |
| 6,271,918 B2 | * | 8/2001 | Blais | 356/625 |
| 6,396,589 B1 | * | 5/2002 | Ebihara | 356/601 |
| 6,542,250 B1 | * | 4/2003 | Michaelis et al. | 356/601 |

\* cited by examiner

*Primary Examiner*—Samir Ahmed
(74) *Attorney, Agent, or Firm*—Karl Hormann

(57) ABSTRACT

A method of taking three-dimensional measurements of an object surface by means of a camera movable between initial and terminal positions relative to the object surface in which object coordinates are determined by gray scale curves of images formed on sensors of the camera.

Tracking of characteristics of an image taken at an initial position to an image taken at a terminal position is made safer and simpler by incremental tracking over one or more images taken at camera positions intermediate the initial and terminal positions.

8 Claims, 3 Drawing Sheets

METHOD OF TAKING THREE-DIMENSIONAL MEASUREMENTS OF OBJECT SURFACES

BACKGROUND OF THE INVENTION

1. Field of the Invention

The invention, in general, relates to a method of taking three-dimensional measurements of object surfaces and, more particularly, to a method of using a digital camera for taking such measurements by defining the object coordinates from the curves of the gray scales of images of the object surfaces generated on the sensor of the camera. Such a method is of particular use for measuring static object surfaces.

2. The State of the Art

It is known by means of two cameras to take three-dimensional measurements of object surfaces by triangulation. In such a method, in the initial step a so-called corresponding pair of points is defined in images of the two cameras. These are image points generated by forming images of identical surface points (FIG. 1). If the coordinates of the corresponding pair of points in the two images are known, the triangulation proper may be carried out by calculating the coordinates of the surface point as the intersection of the two "visual rays".

Points within characteristic image elements of one of the cameras are often chosen for such coordinate calculations. When (automatically) defining a corresponding point in the image of the other camera, it is necessary initially to find the corresponding image element. This may be problematic when there are several similar elements all which may, in theory, apply (FIG. 2). These ambiguities in the definition of corresponding pairs of points (the so-called correspondence problem) have to be solved in order to be able to perform the triangulation. The correspondence or identity problem and, hence, the number of ambiguities, may be substantially reduced by applying epipolar geometry. For reasons of certain geometric necessities the point corresponding to a chosen one can only be positioned on the epipolar line (FIG. 2). However, in order to be able to define the epipolar line, the internal and external camera parameters must be known.

At present, no universal method of solving the correspondence problem is known. There are, however, several methods for solving, or at least significantly reducing, the problem at predetermined conditions of measurements: A widely known method consists of the projection, by a pattern projector, of gray coded patterns (for instance, German patent specifications 3,119,857 A1 and 4,120,115 A1) onto the surface. In this method, very coarsely structured patterns becoming progressively finer are projected for subdividing both images into many corresponding areas. Because of the necessity of multiple projections, this method can only be used in the close-up range and with static objects. Moreover, its costs are of some significance since it requires a relatively high-grade projector suitable for generating precise and, above all, reproducible lines.

In another method, two structurally identical cameras are used the optical axes of which extend parallel to each other. Furthermore, the to image sensors must be positioned in one plane and must be aligned relative to each other at "the same level". This is said to be the so-called normal case (Klaus, K.: Photogrammetrie - Grundlagen und Standardverfahren, Band 1, Ferd. Dümmlers Verlag, Bonn, 1990) [Klaus, K.: Photogrammetry—Basics and Standard Methods; Vol. 1, Ferd. Dümmlers Publisher, Bonn, 1990]. This approach does not solve, but it significantly reduces, the correspondence problem. The described exposure conditions may, however, only be realized by approximation. One example, is the alignment of the optical axes. The principle is as follows: At a relatively small spacing (width of the basis) between the cameras, the difference between corresponding image elements, the so-called parallaxes, are also relatively small. Hence, there is only a small applicable range. The disadvantage of this method is that at a small width of the basis the measurement error is automatically large. If, however, the width of the basis is increased, the areas of possible correspondence are increased as well.

In a further method the image content is analyzed: A search is made for characteristic elements in both images and special parameters for evaluating these elements are calculated (Haralick R. M.; Shapiro, L. G.: Computer and Robot Vision, Volume II, Addison-Welsey Publishing Company, Inc., 1993). This leads to a significant reduction in ambiguities. The method may be used for measuring large objects (e.g. houses) as well as moving objects. The disadvantages of this method are that on the one hand it is not perfect and that, on the other hand, it requires special algorithms which increases the complexity of the calculations. Furthermore, the algorithms may, under certain circumstance, have to be adjusted to the image content.

The examples set forth make clear, as has already been mentioned, that there is as yet no universal solution to the correspondence problem.

OBJECTS OF THE INVENTION

It is, therefore, an object of the invention, to propose a method and a related arrangement which for taking three-dimensional optical measurements of object surfaces with a single digital camera provides a simple and substantially certain solution to the correspondence problem. As a peripheral condition, the invention assumes that the surfaces of which measurements are to be taken will act as static objects at least during the time of making exposures.

BRIEF SUMMARY OF THE INVENTION

In accordance with the invention, the object is accomplished by a method of taking three-dimensional measurements of object surfaces in which a digital camera and the object surface sequentially assume at least three different predeterminable positions relative to each other, in which at least one image of the object surface at each of these positions is generated by the digital camera which image is subjected to the operations of:

a) detecting and selecting those elements (edges, corners) or blocks of pixels of sufficient structure in an image generated in the initial position the object coordinates of which are to be defined and of storing the pixel coordinates of the selected elements or pixel blocks;

b) testing in an image taken at an intermediate position between the initial and terminal positions whether in the predetermined close environment of each of the elements or pixel blocks selected in step a) there is present an element of exactly the same kind or a pixel block of sufficient structure of the same kind and, in case of a positive result, validating the elements or pixel blocks, or, otherwise, either excluding the element or pixel block from further processing or repeating at least once the test in respect of an image generated at a position which results in a smaller displacement of the elements or pixel blocks compared to the one of the image previously tested with a negative result;

c) if tracking of elements or pixel blocks considered to have been tracked already, is to be continued for at least a further intermediate position, testing each image generated at these intermediate positions to determine if in the predetermined close proximity of the elements or pixel blocks determined as already tracked in accordance with a previous test there is present exactly one element of the same kind or a pixel block of sufficient structure of the same kind and at a positive result designating the elements or pixel blocks as tracked or, otherwise, excluding the element or pixel block from further processing or of repeating at least once the test for an image generated at a position leading to a smaller displacement of the elements or pixel blocks compared to the displacement of the image previously tested with a negative result;

d) testing in an image generated at a terminal position if in the predetermined close proximity of each elements or pixel block determined by a previous step as having been tracked there is present exactly one element of the same kind or pixel block of the same kind, and in case of a positive result determining these element s or pixel blocks as having been tracked from an initial or terminal position and storing the pixel coordinates of the elements or pixel blocks, and, otherwise, excluding the element or pixel block from further processing or again testing in accordance with step c) an image generated at a position leading to a smaller displacement of the elements or pixel blocks compared to the displacement in the image generated at the terminal position and repeating step d); and e) calculating the three-dimensional coordinates of the object surfaces in a conventional manner by use of the internal and external camera parameters at the initial and terminal position in respect of the coordination of the elements or pixel blocks determined as having been tracked from the initial to the terminal position.

In another aspect of the invention, the object is accomplished by an arrangement in which the digital camera may be positioned by a mover, motorized or manually, into at least three different predeterminable positions.

The basic concept of the invention resides in the fact that tracking of elements (edges, corners) or of pixel blocks or sufficient structure, from an image generated at the initial position of the camera to an image generated at the terminal position of the camera is made easier and safer when tracking takes place incrementally by way of one or more images generated in camera positions located between the initial and terminal positions of the camera (hereinafter referred to as "intermediate positions").

Therefore, a particular advantage of the invention resides in the fact that the common compromise between a large and a small base width (distance of the camera between each other) has been solved in an sophisticated manner.

The invention may be utilized with particular advantage whenever it is not possible to use a projector of the kind required in connection with certain prior art methods, for generating a plurality of suitable patterns. This would be the case when taking measurements of large objects (for instance, houses), in particular. However, the invention may also be applied advantageously and cost-efficiently at close ranges as it may be utilized in a cost-efficient and simple manner in view of the fact that no sample projector is required.

A further advantage of the invention resides in the fact that the number of process steps necessary for processing the image data may be adapted to the degree of complication in tracking the elements or pixel blocks.

Other objects will in part be obvious and will in part appear hereinafter.

OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENT

As used herein, the term "camera" is intended collectively to connote any kind of camera provided with digital sensors. However, equipment of the kind capable of storing an image of an object surface in terms of density and color distribution on a substrate and of subsequently recording the density and color distribution in a pixel-wise manner are also intended to be a camera in the sense of the present specification. Such equipment may be understood to mean a conventional camera and a scanner.

In accordance with the invention, measuring arrangement consists of a digital camera arranged upon a motion imparting mechanism, hereinafter sometimes referred to as a mover (FIG. 3) The mover is mounted rigidly relative to the object to be measured. Usually, the mover affects linear movement of the digital camera. However, an arcuate displacement is favorable as well if it leads to optimizing.

Figure 1:
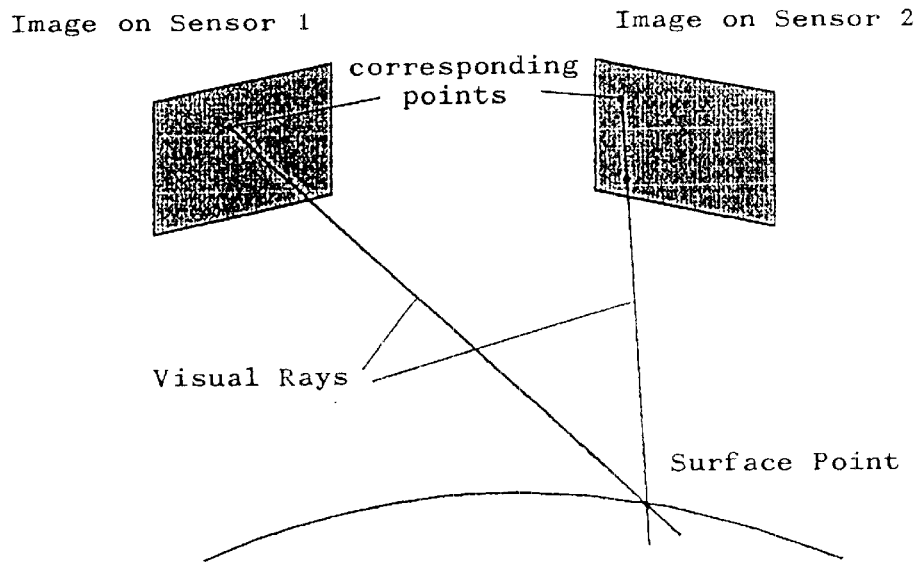
FIG. 1 is a schematic presentation of the geometric relationships for calculating in the three-dimensional coordinates of a surface point by triangulation (Prior Art)
Figure 2:
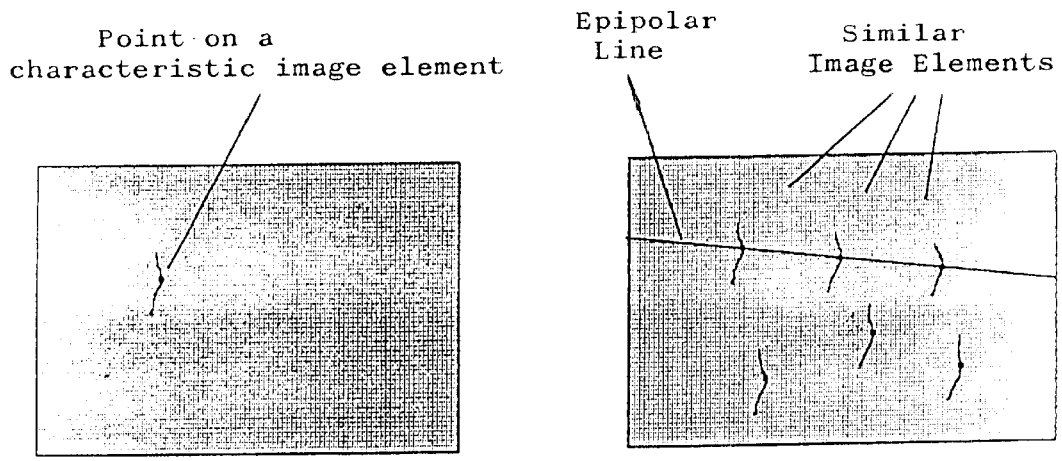
FIG. 2 is a schematic presentation to demonstrate the correspondence problem in the tracking of similar image elements in successive images, as well as the limitation of the search area by the epipolar line (Prior Art)
Figure 3:
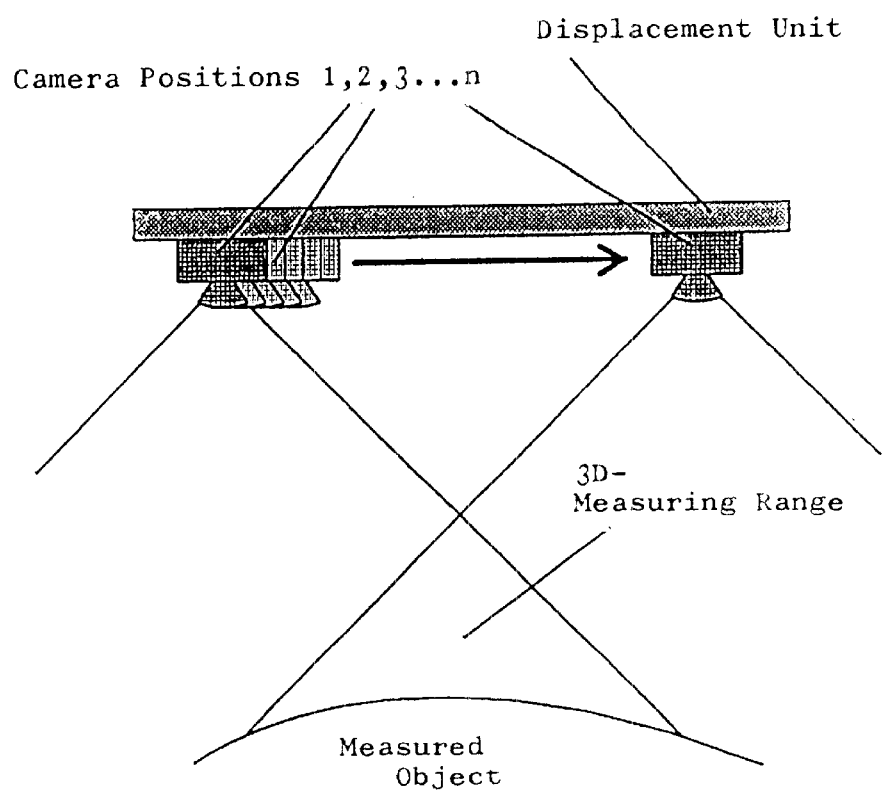
FIG. 3 is a schematic presentation of an arrangement for carrying out the method in accordance with the invention, comprising a camera and a mover.

A series of images differing from each other by very small displacements is taken by means of the digital camera. Initially, a picture or image is taken of the object to be measured while the camera is in its starting position (FIG. 3, Position 1). Thereafter, the camera is shifted insignificantly (FIG. 3, Position 2) and a picture is taken in this intermediate position. This procedure continues until the terminal position (FIG. 3, Position n) of the camera has been reached.

The method in accordance with the invention combines the advantages of small and large base widths as used in stereo photogrammetry: The very small displacements between successive positions correspond to very small base widths. The base width between camera positions 1 and n is sufficiently large to accommodate a relatively exact calculation of 3D coordinates.

Figure 4:
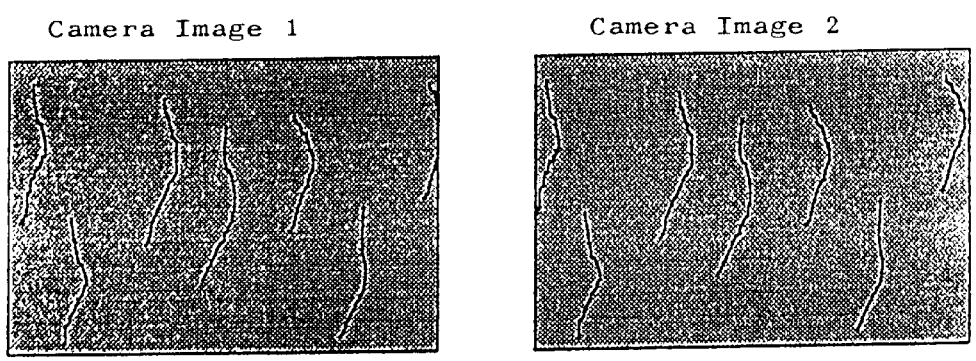
FIG. 4 depicts extracted elements (e.g. edges) with very small differences between successive images.
Figure 5:
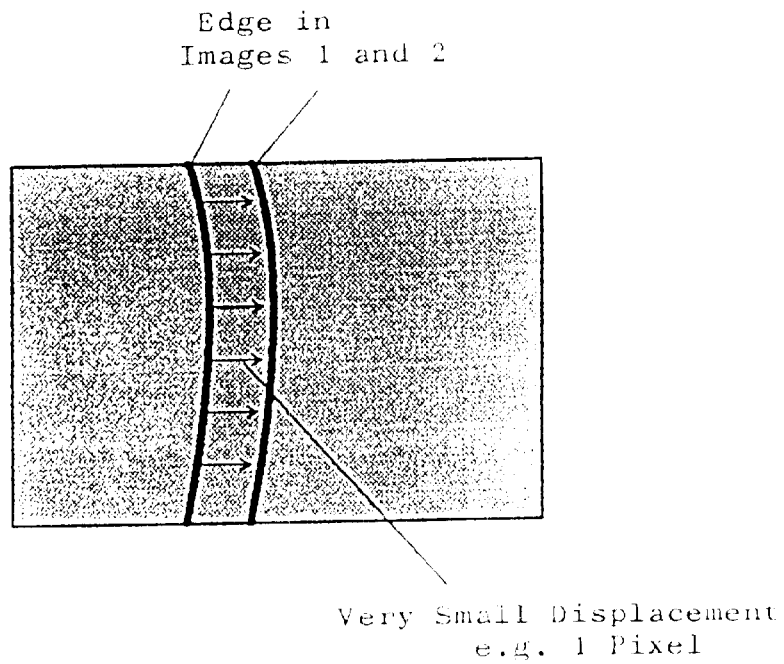
FIG. 5 is portion of an image at a strongly enlarged scale of a very insignificant displacement of an element in successive images.

As a result of the very small displacements between successive positions of the digital camera the differences between the images of these camera positions are insignificant (FIG. 4). This, in turn, leads to insignificant shifts of the extracted elements between the images (FIG. 5). This simplifies the tracking of elements or of pixel blocks of sufficient structure between the images taken by the digital camera from neighboring camera positions. This makes possible a safe and simple solution of the correspondence problem between successive images and, hence, also between those images taken at the start and terminal positions of the digital camera (FIG. 3, camera positions 1 and n). The 3D coordinates will the be calculated on the basis of the last mentioned images.

A favorable method of evaluating the images consists of extracting characteristics, such as edges, in all images. Initially, (as many as possible) characteristics are extracted in an image 1 taken at the starting position of the camera. These characteristics may be edges as well as corners. Where edges have been selected it is necessary to chose individual points thereon which are to be tracked in the further images. The image coordinates of these points will be stored. The tracking of a characteristic is being realized by searching for a characteristic of the same kind in the next image or in one of the following images in close proximity. The size of the close proximity (e.g. 1 pixel . . . 3×3 pixels) is determined by the user. When using the arrangement shown in FIG. 3 the characteristics will shift along the image lines. Hence, the close proximity is a small section of an image line, commencing from the characteristics and their known directions, depending on the direction of movement of the camera. It may in general be assumed that exactly one characteristic will be present in this area. If there is no characteristic it is assumed to be lost and further tracking is dispensed with. If more than one characteristic is found there will be an ambiguity problem. In such a case tracking is abandoned as well. In accordance with the invention the search for characteristics not tracked may be repeated in an image the characteristics of which display a small displacement.

In this manner, selected characteristics are being tracked from image to image. Thus association of the image coordinates of the characteristics of an image taken at the initial or starting position of the camera (FIG. 3, camera position 1) with an image taken at the terminal position of the camera (FIG. 3, camera position n) is realized. The 3D coordinates may calculated in a conventional manner by triangulation on the basis of these pairs of image coordinates.

Figure 6:
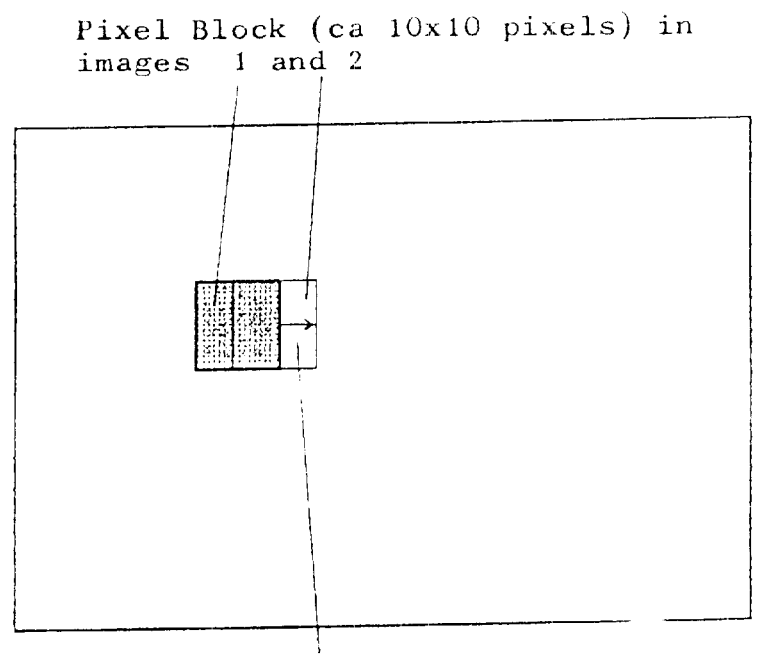
FIG. 6 shows tracking of a pixel block of FIGS. 1 and 2.

In addition to tracking of edge points or corners it is possible to track pixel blocks (FIG. 6). As a rule these will be sized from about 10×10 to about 15×15 pixels. When selecting these blocks in the first camera image care must be taken to obtain a sufficient gray scale structure in order to allow for proper identification.

As a rule the coordinates of its center are associated with a selected pixel block. For defining the new position in the next image it is again the close proximity which is being searched. The minimum of the sum of the error squares is used as a detection criterion. The minimum may be defined in the pixel range as well as in the sub-pixel range. Another useful criterion would be the cross correlation coefficient. In that case, the maximum has to be defined. The 3D coordinates are calculated by triangulation proceeding from the center coordinates of the pixel blocks.

What is claimed is:

1. A method of taking a three-dimensional measurement of an object surface by a digital camera having a predetermined optical axis and the object surface successively assuming at least an initial position, an intermediate position and a terminal position relative to each other and by taking at each such position at least one image of the object surface by the camera, comprising the steps of subjecting the at least one image to the following operations:

a) detecting and selecting in an image taken at the initial position first characteristics of sufficient structure;

b) defining the object coordinates of the selected first characteristics;

c) storing the pixel coordinates;

d) testing in an image taken at a position intermediate the initial and terminal positions if in close proximity of the first characteristics selected in step a) there is present exactly one second characteristic of the same kind;

e) classifying, in case of a positive result, the first and second characteristics as tracked;

f) excluding, in case of a negative result, the second characteristic from further processing and, alternatively, repeating the test in respect of an image taken at a position resulting in a lesser displacement of the characteristics relative to those of the image previously tested with the negative result;

g) testing, in case tracking of characteristics classified as tracked is to be continued in respect of at least one other intermediate position, in each image taken at such at least one intermediate position if in the predetermined close proximity of characteristics classified in a previous test as tracked there is present exactly one third characterisitic of the same kind;

h) classifying, in case of a positive result, the third characteristc as tracked;

i) excluding, in case of a negative result, the third characteristic from further processing and, alternatively, repeating the test in respect of an image taken at a position resulting in a lesser displacement of the characteristics relative to those of the image previously tested with the negative result;

j) testing in an image taken at the terminal position if in the close proximity of each characteristic classified in a prior step as tracked there is present exactly one fourth characteristic of the same kind;

k) classifying, in case of a positive result, the fourth characteristic as tracked from the initial position or towards the terminal position;

l) storing the pixel coordinates of the fourth characteristics;

m) excluding, in case of a negative result, the fourth characteristics from further processing and, alternatively, executing a test as in step g) in respect of an image taken at a position leading to a lesser displacement of the characteristics relative to that of the image taken at the terminal position;

n) repeating the test of step j);

o) calculating the three-dimensional coordinates of the object surface using inner and outer camera parameters at the initial and terminal position for coordinating the characteristics classified as tracked from the initial position to the terminal position.

2. The method of claim 1, wherein the characteristics comprise pixel blocks of predetermined structure.

3. The method of claim 1, wherein the initial, intermediate and terminal positions are attained by relative movement between the camera and the object surface along substantially planar paths.

4. The method of claim 3, wherein at least one path extends along a straight line.

5. The method of claim 3, wherein the optical axis of the camera extends substantially normal to the path of movement between the camera and the object surface.

6. The method of claim 3, wherein the close proximity comprises a linear range extending on either side of the position of the characteristic.

7. The method of claim 1, wherein the camera is moved manually between the initial and terminal positions.

8. The method of claim 1, wherein the camera is moved by a motor between the initial and terminal positions.

* * * * *